United States Patent
Tajima

(10) Patent No.: US 11,211,880 B2
(45) Date of Patent: Dec. 28, 2021

(54) POWER CONVERSION DEVICE INCLUDING AN INVERTER AND FIRST AND SECOND CURRENT DETECTORS

(71) Applicant: TOSHIBA MITSUBISHI-ELECTRIC INDUSTRIAL SYSTEMS CORPORATION, Chuo-ku (JP)

(72) Inventor: Hidenobu Tajima, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 16/957,821

(22) PCT Filed: Nov. 21, 2018

(86) PCT No.: PCT/JP2018/042959
§ 371 (c)(1),
(2) Date: Jun. 25, 2020

(87) PCT Pub. No.: WO2020/105133
PCT Pub. Date: May 28, 2020

(65) Prior Publication Data
US 2021/0067056 A1    Mar. 4, 2021

(51) Int. Cl.
*H02M 1/32*    (2007.01)
*H02M 7/5387*    (2007.01)
(Continued)

(52) U.S. Cl.
CPC ......... *H02M 7/53871* (2013.01); *H02M 1/08* (2013.01); *H02M 1/32* (2013.01); *H02M 1/0009* (2021.05); *H02M 7/53876* (2021.05)

(58) Field of Classification Search
CPC ......... H02M 7/53871; H02M 7/53876; H02M 7/48; H02M 1/08; H02M 1/0009; H02M 1/32; H02M 1/325
See application file for complete search history.

(56) References Cited

U.S. PATENT DOCUMENTS

| 2005/0035815 A1* | 2/2005 | Cheng | H02M 1/12 327/552 |
| 2009/0168474 A1* | 7/2009 | Katoh | H02J 3/01 363/78 |
| 2018/0234030 A1* | 8/2018 | Kamiko | H02M 7/5395 |

FOREIGN PATENT DOCUMENTS

JP    8-98542 A    4/1996

OTHER PUBLICATIONS

International Search Report dated Dec. 25, 2018 in PCT/JP2018/042959 filed Nov. 21, 2018.

\* cited by examiner

*Primary Examiner* — Kyle J Moody
*Assistant Examiner* — Jye-June Lee
(74) *Attorney, Agent, or Firm* — Oblon, McClelland, Maier & Neustadt, L.L.P.

(57) ABSTRACT

A control device controls an inverter such that a detected value of an output current of an inverter follows a current command value. The control device is configured to calculate a current deviation between the current command value and the detected value of the output current of the inverter, and control switching of switching elements to allow the calculated current deviation to be equal to or less than a current deviation command value. The control device sets a current limiter for a load current, the current limiter being smaller than an over current level, a load current with a current limiter smaller than an overcurrent level. When the detected value of the load current is larger than the current limiter, the control device reduces the current deviation command value to be smaller than that applied when the load current is smaller than the current limiter.

5 Claims, 9 Drawing Sheets

(51) Int. Cl.
*H02M 1/08* (2006.01)
*H02M 1/00* (2006.01)

FIG.8

| CURRENTLY OUTPUT VOLTAGE VECTOR | CURRENT DEVIATION VECTOR ANGLE θ Δi | | | | | | |
|---|---|---|---|---|---|---|---|
| | -30~30° | 30~90° | 90~150° | 150~210° | 210~270° | 270~330° | |
| V0 | V1 | V3 | V3 | V5 | V5 | V1 | |
| V1 | V1 | V2 | V0 | V0 | V0 | V6 | |
| V2 | V1 | V2 | V3 | V7 | V7 | V7 | |
| V3 | V0 | V2 | V3 | V4 | V0 | V0 | |
| V4 | V7 | V7 | V0 | V4 | V5 | V7 | |
| V5 | V0 | V0 | V7 | V7 | V5 | V6 | |
| V6 | V1 | V7 | V4 | V4 | V5 | V6 | |
| V7 | V2 | V2 | V4 | V4 | V6 | V6 | |

# POWER CONVERSION DEVICE INCLUDING AN INVERTER AND FIRST AND SECOND CURRENT DETECTORS

TECHNICAL FIELD

The present invention relates to a power conversion device.

BACKGROUND ART

Japanese Patent Laying-Open No. 8-98542 (PTL 1) discloses a method of controlling an inverter which converts DC power into AC power and supplies it to a load. In PTL 1, a current limiter circuit is provided to a load current detection circuit in an output circuit of the inverter. The value of the load current detected via the current limiter circuit and a no-load current command generated based on a reference voltage are added together to generate an instantaneous current value control signal. Then, a feedback signal of the output current of the inverter is added to the instantaneous current value control signal to generate a current control signal. Furthermore, a voltage control signal composed of an instantaneous voltage value control signal generated based on the reference voltage and an average voltage value control signal is multiplied by a signal output from a voltage signal generator and varying based on a limiter operation signal output from the current limiter circuit to generate a voltage control signal. The sum of the two current and voltage control signals serves as a control signal to a PWM (pulse width modulation) control circuit.

In PTL 1, when an overcurrent is detected in the output circuit of the inverter, the signal level from the voltage signal generator is zeroed in response to the limiter operation signal from the current limiter circuit. That is, the control signal input to the PWM control circuit is only the current control signal.

CITATION LIST

Patent Literature

PTL 1: Japanese Patent Laying-Open No. 8-98542

SUMMARY OF INVENTION

Technical Problem

According to the control method described in PTL 1 described above, when an overcurrent is detected, the signal level of the voltage control signal is instantaneously zeroed, and accordingly, the inverter operates as a current source. As a result, the output current of the inverter is suppressed to the limiter value of the current limiter circuit. When the limiter operation is stopped, the inverter is controlled in voltage with cushion start as the voltage control signal is a sequential level signal. Thus, even if an overcurrent occurs, the inverter can be operated continuously without being stopped.

In the above control method, however, when an overcurrent is detected, the amount of controlling the voltage is instantaneously zeroed, and accordingly, the voltage control will instantaneously be stopped. As a result, there is a concern that the inverter's output voltage may be distorted.

The present invention has been made in order to solve the above problem, and an object thereof is to provide a power conversion device which can continue to operate stably without generating an overcurrent.

Solution to Problem

According to one aspect of the present invention, a power conversion device comprises: an inverter that has a switching element and converts DC power into AC power; a first current detector that detects an output current of the inverter; a second current detector that detects a load current flowing from the inverter to a load; and a control device that controls the inverter to allow the output current detected by the first current detector to follow a current command value. The control device is configured to calculate a current deviation between the current command value and the output current detected by the first current detector, and control switching of the switching element to allow the calculated current deviation to be equal to or less than a current deviation command value. The control device sets a current limiter for the load current, the current limiter being smaller than an overcurrent level. When the load current detected by the second current detector is larger than the current limiter the control device reduces the current deviation command value to be smaller than the current deviation command value applied when the load current is smaller than the current limiter.

Advantageous Effects of Invention

The present invention can thus provide a power conversion device which can continue to operate stably without generating an overcurrent.

BRIEF DESCRIPTION OF THE DRAWINGS

FIG. 8 is a diagram showing an example of a voltage vector selection table used by a switching sequence logic circuit.

DESCRIPTION OF EMBODIMENTS

Hereinafter reference will be made to the drawings to describe the present invention in embodiments. Note that in the figures, identical or equivalent components are identically denoted and will not be described repeatedly.

First Embodiment

Figure 1:
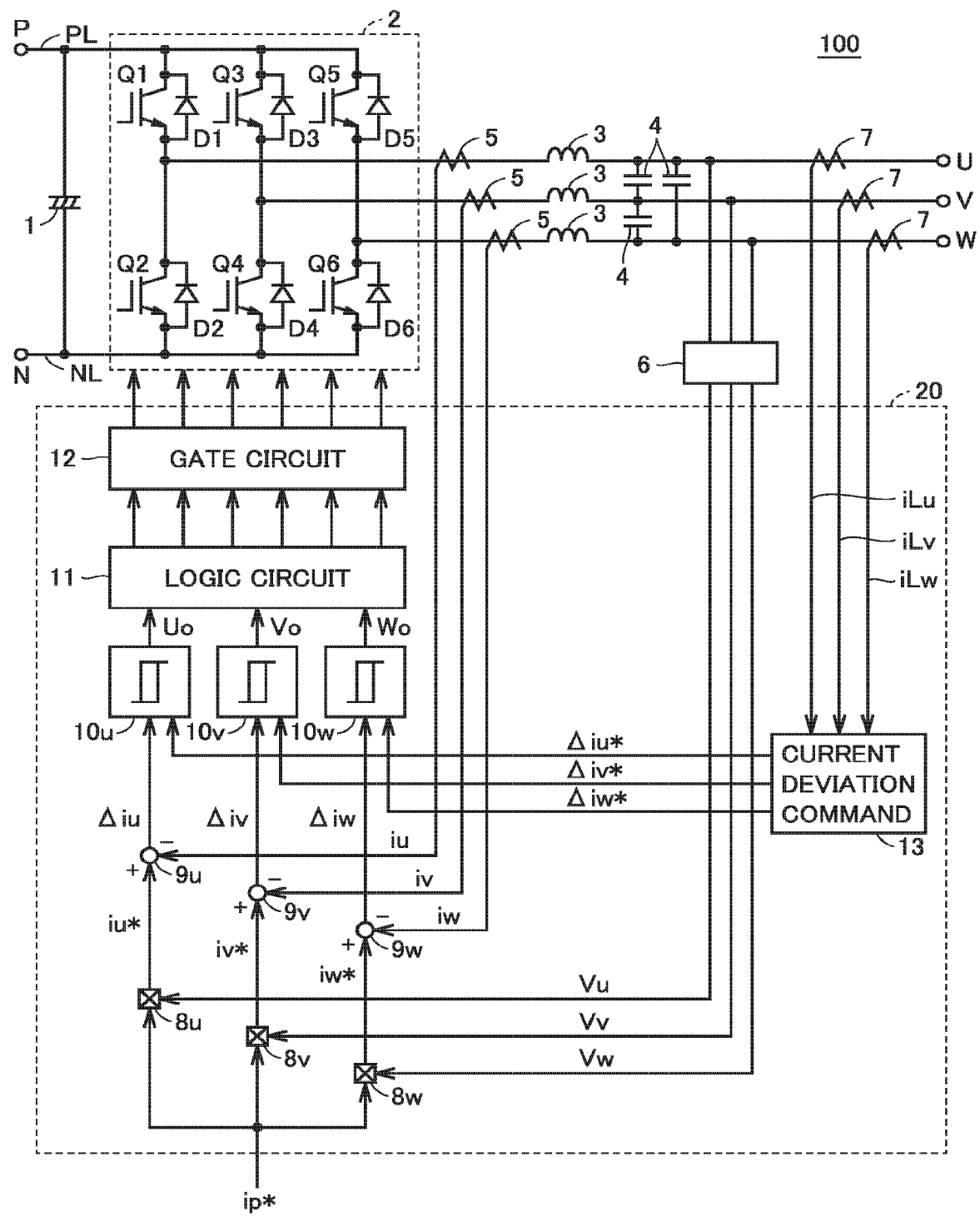
FIG. 1 schematically shows a configuration of a power conversion device according to a first embodiment of the present invention.

FIG. 1 schematically shows a configuration of a power conversion device according to a first embodiment of the present invention. The power conversion device according to the present embodiment is configured to perform power conversion between DC power and three-phase AC power (U-phase power, V-phase power, W-phase power).

Referring to FIG. 1, a power conversion device 100 comprises DC terminals P and N, AC terminals U, V and W, a DC smoothing capacitor 1, an inverter 2, a reactor 3, an AC capacitor 4, current detectors 5 and 7, a voltage detector 6, and a control device 20.

DC terminal P (a high potential side DC terminal) and DC terminal N (a low potential side DC terminal) receive DC power from a DC power supply (not shown). A DC positive bus PL is connected to DC terminal P, and a DC negative bus NL is connected to DC terminal N. DC smoothing capacitor 1 is connected between DC terminal P and DC terminal N. A load (not shown) is connected to AC terminals U, V, W. AC terminal U is a U-phase terminal, AC terminal V is a V-phase terminal, and AC terminal W is a W-phase terminal.

Inverter 2 converts DC power from DC smoothing capacitor 1 into three-phase AC power. Three-phase AC power output from inverter 2 is supplied to the load (not shown) via AC terminals U, V, W. Inverter 2 has power semiconductor switching elements (hereinafter, also simply referred to as "switching elements") Q1 to Q6.

Switching elements Q1 and Q2 are connected in series between DC positive bus PL and DC negative bus NL to form a U-phase arm. Switching elements Q3 and Q4 are connected in series between DC positive bus PL and DC negative bus NL to form a V-phase arm. Switching elements Q5 and Q6 are connected in series between DC positive bus PL and DC negative bus NL to form a W-phase arm.

While in FIG. 1 an IGBT (Insulated Gate Bipolar Transistor) is used as the switching element, a MOSFET (Metal Oxide Semiconductor Field Effect Transistor) or any self arc-distinguishing switching element can be used. Diodes D1 to D6 are connected in anti-parallel to switching elements Q1 to Q6, respectively. Diodes D1 to D6 are each provided to pass a freewheel current when the respective switching element is turned off. When the switching element is a MOSFET, the free wheeling diode is composed of a parasitic diode (a body diode). When the switching element is an IGBT which does not have a diode incorporated therein, the free wheeling diode is composed of a diode connected to the IGBT in anti-parallel.

Reactor 3 and AC capacitor 4 constitute a filter circuit, and remove a harmonic component generated from inverter 2. Reactor 3 has one end connected to a connection point of the two switching elements of the respective phase arm. Reactor 3 has the other end connected to the AC terminal of the respective phase. AC capacitor 4 is connected between two phases.

Current detector 5 detects three-phase AC current iu, iv, iw output from inverter 2 (hereinafter also referred to as an output current) and provides a detected value to control device 20. Current detector 7 detects three-phase AC current iLu, iLv, iLw supplied from AC terminals U, V, W to the load (hereinafter also referred to as a load current), and provides a detected value to control device 20. Voltage detector 6 detects three-phase AC voltage (U-phase voltage Vu, V-phase voltage Vv, W-phase voltage Vw), and provides a detected value to control device 20.

Control device 20 controls the switching of switching elements Q1 to Q6 constituting inverter 2. Control device 20 generates a control signal (a gate signal) for turning on/off switching elements Q1 to Q6, and outputs the generated control signal to inverter 2. Control device 20 is implemented mainly by a CPU (Central Processing Unit), a memory, an interface circuit, and so forth.

In the present embodiment, control device 20 generates the control signal in an instantaneous current value control method. Specifically, control device 20 includes multipliers $8u$, $8v$, $8w$, subtractors $9u$, $9v$, $9w$, hysteresis comparators $10u$, $10v$, $10w$, a logic circuit 11, a gate circuit 12, and a current deviation command generation circuit 13.

Multiplier $8u$ multiplies U-phase voltage Vu detected by voltage detector 6 by a gain corresponding to a predetermined active current command value ip* to generate a U-phase current command value iu*. Active current command value ip* is a value of a command for an active current output by inverter 2. The weight for active current command value ip* is determined with the gain of voltage detector 6 considered. Multiplier $8v$ multiplies V-phase voltage Vv detected by voltage detector 6 by the gain corresponding to active current command value ip* to generate a V-phase current command value iv*. Multiplier $8w$ multiplies W-phase voltage Vw detected by voltage detector 6 by the gain corresponding to active current command value ip* to generate a W-phase current command value iw*.

Subtractor $9u$ calculates a current deviation Δiu between U-phase current command value iu* and U-phase current iu detected by current detector 5. Subtractor $9v$ calculates a current deviation Δiv between V-phase current command value iv* and V-phase current iv detected by current detector 5. Subtractor $9w$ calculates a current deviation Mw between W-phase current command value iw* and W-phase current iw detected by current detector 5.

Current deviation command generation circuit 13 generates a current deviation command value Δi* (a U-phase current deviation command value Δiu*, a V-phase current deviation command value Δiv*, a W-phase current deviation command value Δiw*) based on a load current iL (iLu, iLv, iLw) detected by current detector 7.

Hysteresis comparator $10u$ receives U-phase current deviation Δiu from subtractor $9u$ and receives U-phase current deviation command value Δiu* from current deviation command generation circuit 13. Hysteresis comparator $10u$ compares U-phase current deviation Δiu with U-phase current deviation command value Δiu*, and outputs a signal indicating a comparison result thereof. Specifically, hysteresis comparator $10u$ changes the logic value of the output signal from "0" to "1" when U-phase current deviation Δiu exceeds U-phase current deviation command value Δiu*. Hysteresis comparator $10u$ changes the logic value of the output signal from "1" to "0" when U-phase current deviation Mu falls below U-phase current deviation command value Δiu*. The output signal of hysteresis comparator $10u$ corresponds to a PWM signal Uo.

Hysteresis comparator $10v$ receives V-phase current deviation Δiv from subtractor $9v$, and receives V-phase current deviation command value Δiv* from current deviation command generation circuit 13. Hysteresis comparator $10v$ compares V-phase current deviation Δiv with V-phase current deviation command value Δiv*, and outputs a signal indicating a comparison result thereof. Specifically, hysteresis comparator $10v$ changes the logic value of the output signal from "0" to "1" when V-phase current deviation Δiv exceeds V-phase current deviation command value Δiv*. Hysteresis comparator $10v$ changes the logic value of the output signal from "1" to "0" when V-phase current deviation Δiv falls below V-phase current deviation command value Δiv*. The output signal of hysteresis comparator $10v$ corresponds to a PWM signal Vo.

Hysteresis comparator 10w receives W-phase current deviation Δiw from subtractor 9w, and receives W-phase current deviation command value Δiw* from current deviation command generation circuit 13. Hysteresis comparator 10w compares W-phase current deviation Δiw with W-phase current deviation command value Δiw*, and outputs a signal indicating a comparison result thereof. Specifically, when W-phase current deviation Δiw exceeds W-phase current deviation command value Δiw*, hysteresis comparator 10w changes the logic value of the output signal from "0" to "1". Hysteresis comparator 10w changes the logic value of the output signal from "1" to "0" when W-phase current deviation Δiw falls below W-phase current deviation command value Δiw*. The output signal of hysteresis comparator 10w corresponds to a PWM signal Wo.

PWM signals Uo, Vo and Wo output from hysteresis comparators 10u, 10v and 10w are input to the logic circuit. The logic circuit subjects PWM signals Uo, Vo, Wo and their logically inverted signals to predetermined on-delay processing to generate a control signal for controlling the switching of switching elements Q1 to Q6 of inverter 2. The control signal generated by the logic circuit is applied to the gate of a respective switching element of inverter 2 through the gate circuit.

Figure 2:
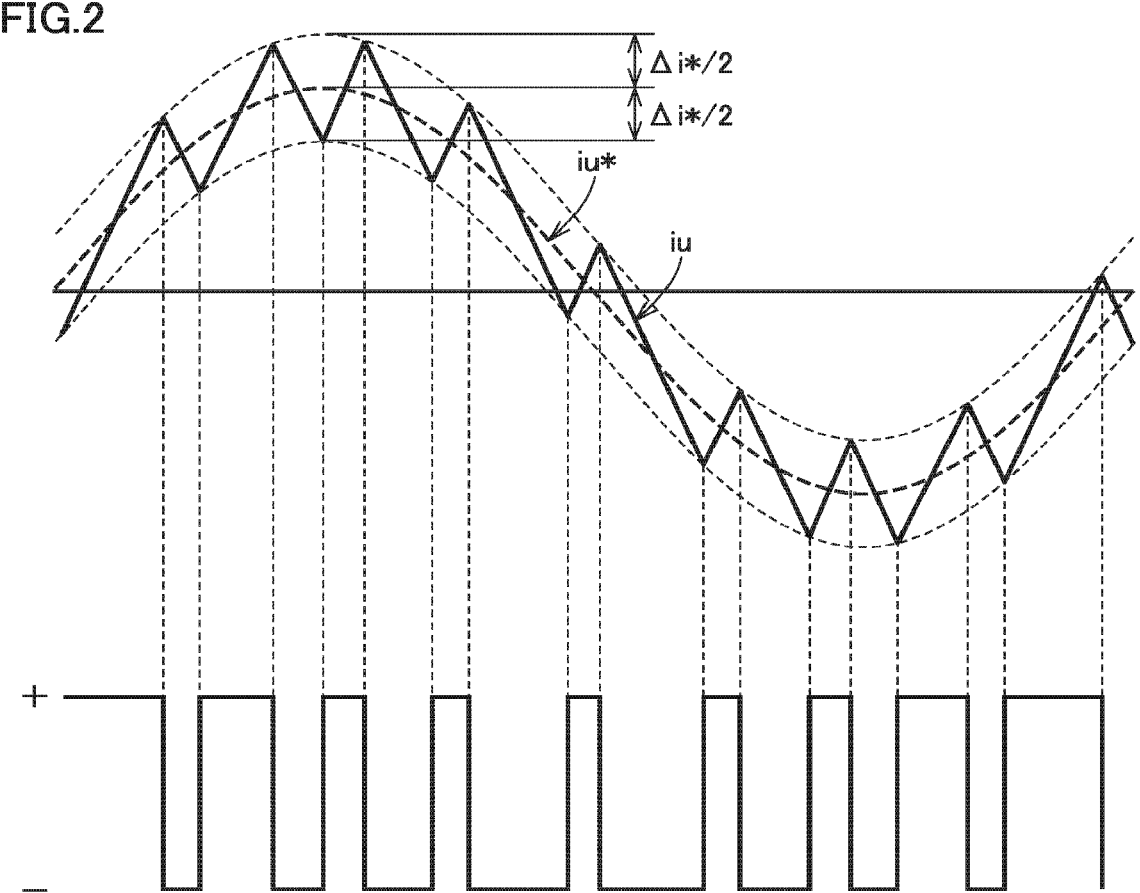
FIG. 2 is a diagram for illustrating an operation of the power conversion device according to the first embodiment.

FIG. 2 is a diagram for illustrating an operation of power conversion device 100 according to the first embodiment. While in FIG. 2 the operation of power conversion device 100 will be described with the U-phase taken as an example, it is similarly discussed for the V-phase and the W-phase.

In FIG. 2 at an upper stage, a broken line represents a sine wave current command value iu*. A dotted line represents a hysteresis band each provided above and below current command value iu*. The hysteresis band has a magnitude of a half of current deviation command value Δiu*. A solid line represents current iu output from inverter 2. FIG. 2 at a lower stage represents a signal output from hysteresis comparator 10u.

When output current iu changes in the positive direction and reaches a current command value (iu*+Δiu*/2), the output signal of hysteresis comparator 10u becomes a logic value of "0." The output signal of the logic value of "0" turns on the switching element on the negative side of inverter 2. As a result, a negative voltage is applied to an AC load, and accordingly, output current iu changes in the negative direction.

When current iu changes in the negative direction and reaches a current command value (iu*−Δiu*/2), the output signal of hysteresis comparator 10u attains a logic value of "1." The output signal of the logic value of "1" turns on the switching element on the positive side of inverter 2. As a result, a positive voltage is applied to the AC load, and accordingly, current iu changes in the positive direction. In this manner, a switching element is switched as controlled to cause current iu to be within the hysteresis band of ±Δiu*/2 with respect to current command value iu*.

Since the gain of inverter 2 is substantially infinite, a high speed current control response can be obtained. However, since the gain of inverter 2 is substantially infinite, a hysteresis band for limiting the switching frequency is required. The maximum switching frequency is determined by the AC load's leakage impedance, DC voltage, the switching element's switching speed, the hysteresis band, and the like.

As has been described above, control device 20 employs an instantaneous current value control method to control a current to follow three-phase current command values iu*, iv*, iw* at high speed. However, when abnormality occurs in the AC voltage or the like, it may cause delayed current control response. As a result, an overcurrent may be generated and power conversion device 100 may no longer be able to continue to operate.

Accordingly, in the first embodiment, a current value smaller than the overcurrent level of the load current is set to a current limiter iLlim for the load current. When the load current increases and reaches current limiter iLlim, control device 20 reduces the hysteresis band.

Specifically, when a value of load current iL detected by current detector 7 becomes higher than current limiter iLim, current deviation command generation circuit 13 reduces current deviation command value Δi* to be smaller than that when the detected value is less than current limiter iLmin.

Figure 3:
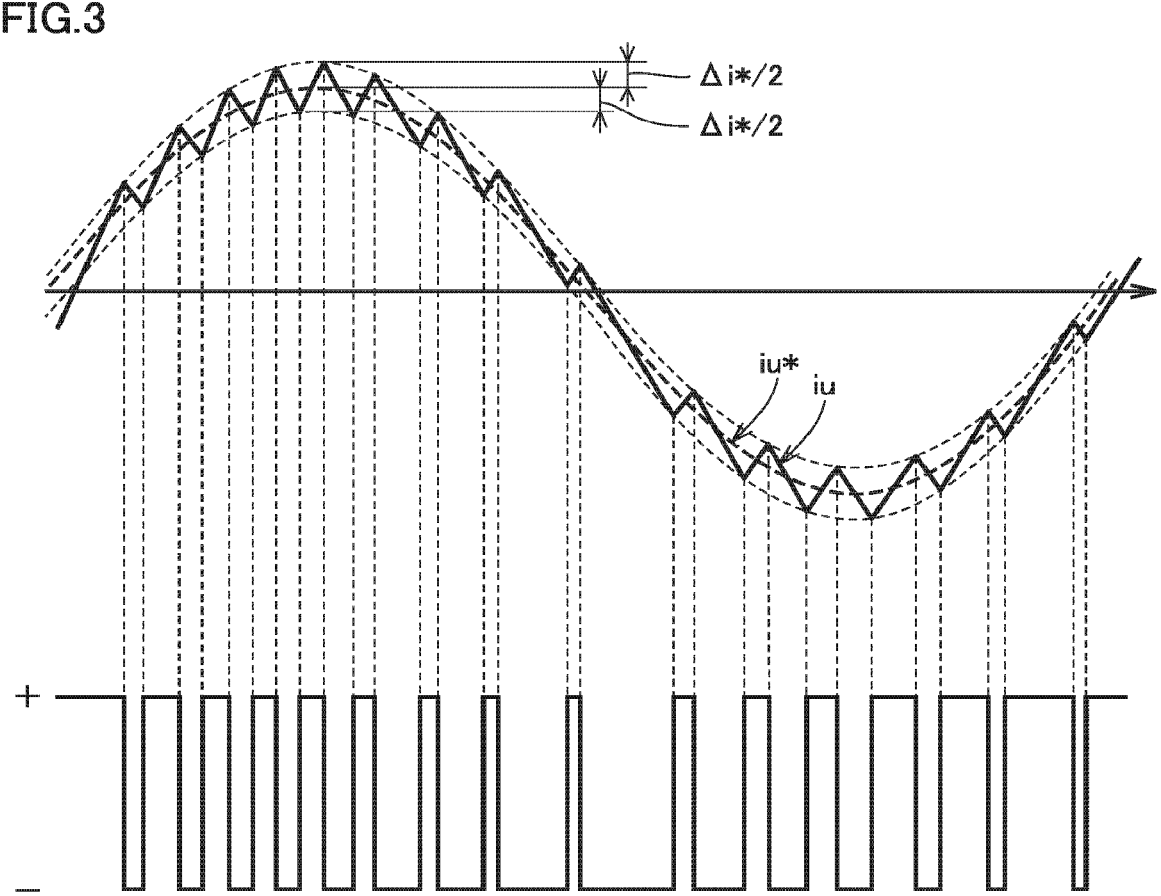
FIG. 3 is a diagram for illustrating an operation of the power conversion device according to the first embodiment.

FIG. 3 is a diagram for illustrating an operation of power conversion device 100 according to the first embodiment, as compared with FIG. 2. While in FIG. 3 the operation of power conversion device 100 will be described with the U-phase taken as an example, it is similarly discussed for the V-phase and the W-phase.

FIG. 3 shows controlling a current when load current iL is higher than current limiter iLlim. In FIG. 3 at an upper stage, a broken line represents sine wave current command value iu*. A dotted line represents a hysteresis band each provided above and below current command value iu*. A solid line represents current iu output from inverter 2. FIG. 3 at a lower stage represents a signal output from hysteresis comparator 10u.

The hysteresis band has a size of Δiu*/2, and when current deviation command value Δiu* is made small, the hysteresis band is decreased. A switching element is switched as controlled to cause current iu to be within the decreased hysteresis band.

In FIG. 3, by reducing the hysteresis band, output current iu will follow current command value iu* more, as compared with FIG. 2. According to this, output current iu has a reduced ripple, and accordingly, load current iL becomes smaller than current limiter iLlim.

Thus, current limiter iLlim having a current value lower than the overcurrent level of the load current is set, and when the load current reaches current limiter iLlim, then, in the instantaneous current value control, performance to follow current command value iu* is enhanced. This can prevent an overcurrent from occurring and allows power conversion device 100 to continue to operate.

However, when FIG. 2 and FIG. 3 are compared, it can be seen that while reducing the hysteresis band allows an enhanced control response, reducing the hysteresis band increases the switching frequency of the switching element. The increased switching frequency increases power loss (or a switching loss) caused in inverter 2. Accordingly, it is preferable that when load current iL does not reach current limiter iLlim, a hysteresis band be determined to provide a suitable switching frequency determined in view of switching loss etc., and when load current iL reaches current limiter iL, the hysteresis band be temporarily reduced.

Figure 4:
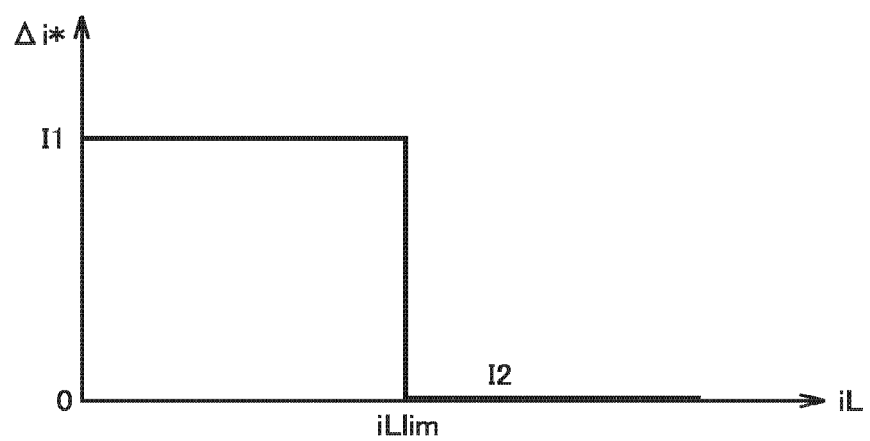
FIG. 4 is a diagram for illustrating a first exemplary operation of a current deviation command generation circuit shown in FIG. 1.

FIG. 4 is a diagram for illustrating a first exemplary operation of current deviation command generation circuit 13 shown in FIG. 1. FIG. 4 is a diagram showing a relationship between current deviation command value Δi* and load current iL. In FIG. 4 the horizontal axis represents load current iL and the vertical axis represents current deviation command value Δi*.

As shown in FIG. 4, when load current iL is less than or equal to current limiter iLlim, current deviation command value Δi* is set to I1. On the other hand, when load current iL is higher than current limiter iLlim, current deviation command value Δi* is set to I2. I2 is set to a value smaller than I1. In the example of FIG. 4, I2=0 is set.

While in the example of FIG. 4, current deviation command value Δi* is changed in two stages of I1 and I2 in accordance with load current iL, it may be changed in three or more stages. In that case, when load current iL becomes higher than current limiter iLlim, current deviation command value Δi* will discretely change from I1 toward 0 in accordance with load current iL.

Figure 5:
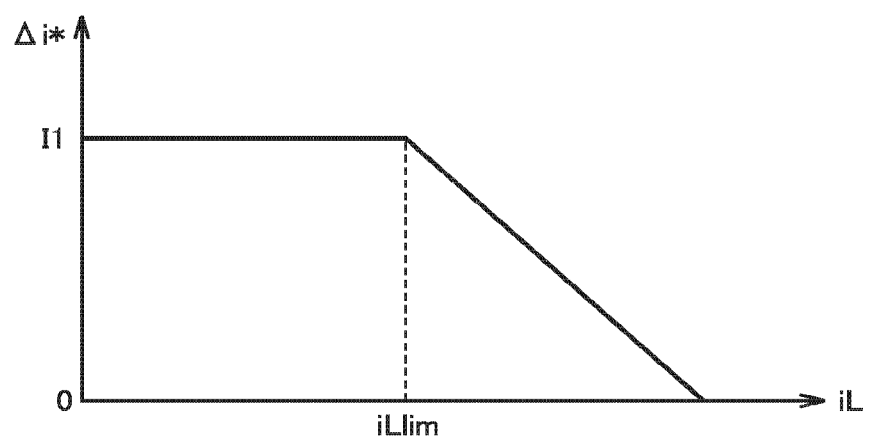
FIG. 5 is a diagram for illustrating a second exemplary operation of the current deviation command generation circuit shown in FIG. 1.

Alternatively, when load current iL becomes higher than current limiter iLlim, current deviation command value Δi* may be continuously changed in accordance with load current iL. FIG. 5 is a diagram for illustrating a second exemplary operation of current deviation command generation circuit 13 shown in FIG. 1. FIG. 5 is a diagram showing a relationship between current deviation command value Δi* and load current iL. In FIG. 5 the horizontal axis represents load current iL and the vertical axis represents current deviation command value Δi*.

As shown in FIG. 5, when load current iL is less than or equal to current limiter iLlim, current deviation command value Δi* is set to I1. In contrast, when load current iL becomes higher than current limiter iLlim, then, current deviation command value Δi* is decreased as load current iL increases. Accordingly, current deviation command value Δi* when load current iL is higher than current limiter iLlim is smaller than current deviation command value Δi* when load current iL is lower than current limiter iLlim.

Although in the example of FIG. 5 current deviation command value Δi* linearly changes in accordance with load current iL, how the value changes is not limited thereto insofar as it changes continuously.

Data indicating the relationship shown in FIG. 4 or 5 can be stored in a memory internal to control device 20. Current deviation command generation circuit 13 can refer to the data to generate current deviation command value Δi* based on load current iL detected by current detector 7. The data may be in the form of a table or a function.

As has been described above, according to the power conversion device of the first embodiment of the present invention, a current limiter having a current value lower than an overcurrent level of a load current is set, and when the load current reaches the current limiter, current deviation command value Δi* in instantaneous current value control is reduced. This allows the output current of the inverter to better follow current command value iu* when the load current reaches the current limiter.

Further, in the power conversion device according to the first embodiment, a current deviation command value in instantaneous current value control is adjusted, and distortion in an output voltage of the inverter can be suppressed, in contrast to PTL 1 describing that voltage control is instantaneously stopped. As a result, the power conversion device can stably continue to operate without generating an overcurrent.

Second Embodiment

Figure 6:
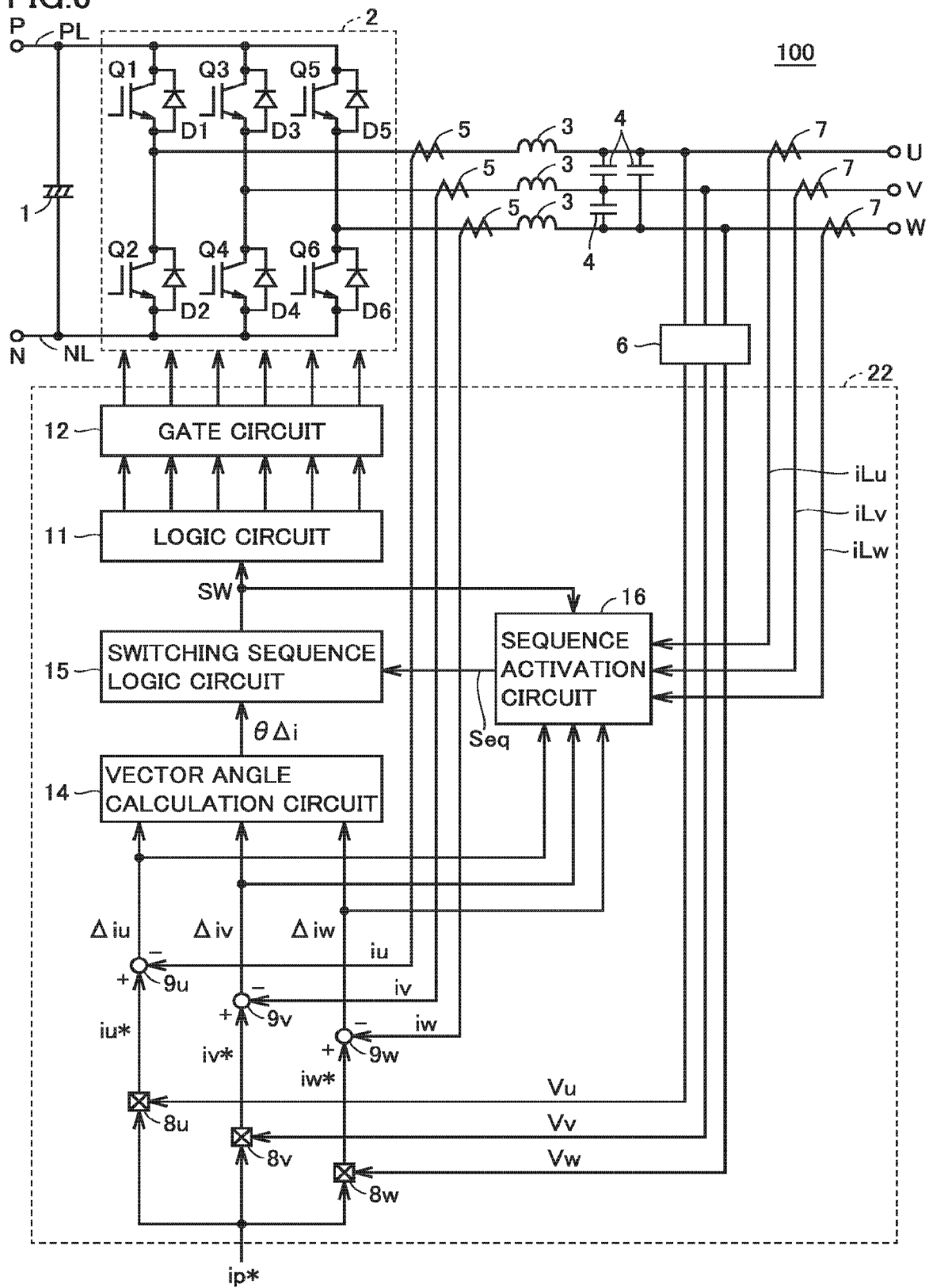
FIG. 6 schematically shows a configuration of a power conversion device according to a second embodiment of the present invention.

In a second embodiment, another example in configuration of the power conversion device in the instantaneous current value control method will be described. FIG. 6 schematically shows a configuration of power conversion device 100 according to the second embodiment of the present invention. Referring to FIG. 6, power conversion device 100 according to the second embodiment differs from power conversion device 100 according to the first embodiment shown in FIG. 1 by the configuration of control device 20. The configuration of power conversion device 100 according to the second embodiment other than control device 20 is the same as that shown in FIG. 1, and accordingly, will not be described repeatedly.

Control device 20 according to the second embodiment has a vector angle calculation circuit 14, a switching sequence logic circuit 15, and a sequence activation circuit 16 in place of hysteresis comparators 10u, 10v and 10w shown in the first embodiment.

Vector angle calculation circuit 14 receives current deviations Δiu, Δiv, Δiw from subtractors 9u, 9v, 9w. Vector angle calculation circuit 14 calculates an angle θΔi of a current deviation vector Δi.

Switching sequence logic circuit 15 generates a switching command vector SW (=swu, swv, sww) for each phase based on current deviation vector angle θΔi output from vector angle calculation circuit 14 and a sequence activation signal Seq output from sequence activation circuit 16.

Sequence activation circuit 16 outputs to switching sequence logic circuit 15 sequence activation signal Seq based on current deviations Δiu, Δiv, Δiw from subtractors 9u, 9v, 9w, switching command vector SW currently output from switching sequence logic circuit 15, and load currents iLu, ILv, iLw detected by current detector 7.

Logic circuit 11 generates a control signal for a switching element of inverter 2 based on switching command vector SW provided from switching sequence logic circuit 15. The control signal generated by logic circuit 11 is applied to the gate of a switching element of inverter 2 through gate circuit 12.

Figure 7:
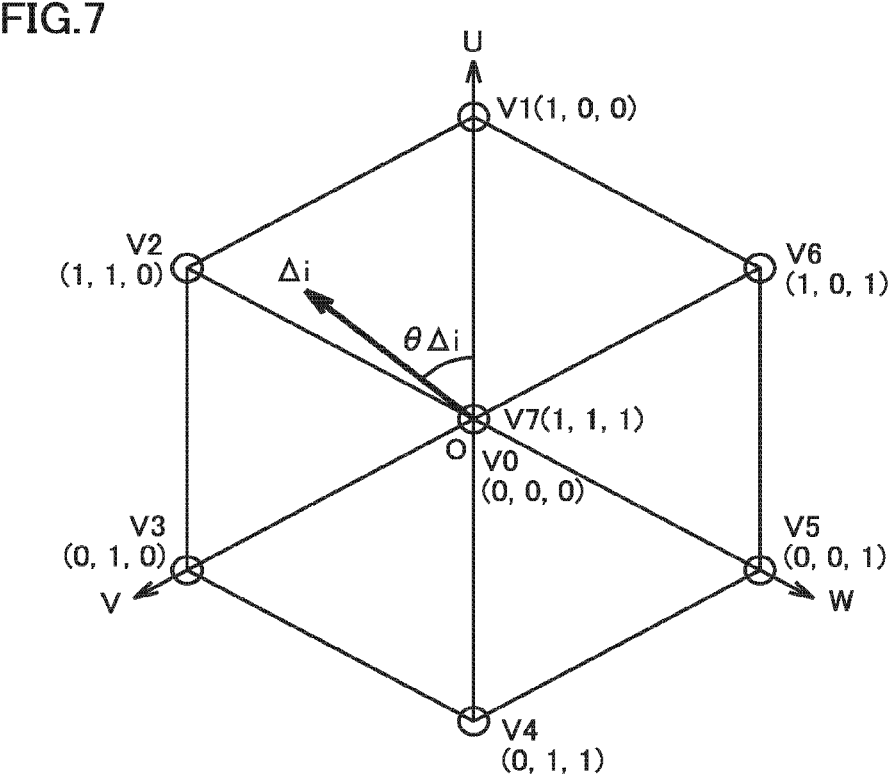
FIG. 7 represents a space vector that the power conversion device according to the second embodiment can output.

FIG. 7 represents a space vector that the power conversion device according to the second embodiment can output. The FIG. 7 vector diagram represents AC voltage that the power conversion device can output by eight types of space vectors V0 to V7.

A space vector V0 is a space voltage vector with a switching command vector (swu, swv, sww)=(0, 0, 0). A space vector V1 is a space voltage vector with a switching command vector (swu, swv, sww)=(1, 0, 0). A space vector V2 is a space voltage vector with a switching command vector (swu, swv, sww)=(1, 1, 0). A space vector V3 is a space voltage vector with a switching command vector (swu, swv, sww)=(0, 1, 0). A space vector V4 is a space voltage vector with a switching command vector (swu, swv, sww)=(0, 1, 1). A space vector V5 is a space voltage vector with a switching command vector (swu, swv, sww)=(0, 0, 1). A space vector V6 is a space voltage vector with a switching command vector (swu, swv, sww)=(1, 0, 1). A space vector V7 is a space voltage vector with a switching command vector (swu, swv, sww)=(1, 1, 1).

When sequence activation signal Seq from sequence activation circuit 16 becomes "1," switching sequence logic circuit 15 updates switching command vector=(swu, swv, sww) based on current deviation vector angle θΔi and the currently output space vector.

As the updated switching command vector SW, from the eight types of space vectors V0 to V7 a voltage vector capable of reducing current deviation Δi is selected based on current deviation vector angle θΔi and the currently output space voltage vector.

FIG. 8 is a diagram showing an example of a voltage vector selection table used by switching sequence logic circuit 15. Switching sequence logic circuit 15 has a storage circuit (not shown) for storing the selection table.

Switching sequence logic circuit 15 uses the voltage vector selection table to select a space voltage vector to be output next time from current deviation vector θΔi and the currently output space voltage vector.

Figure 9:
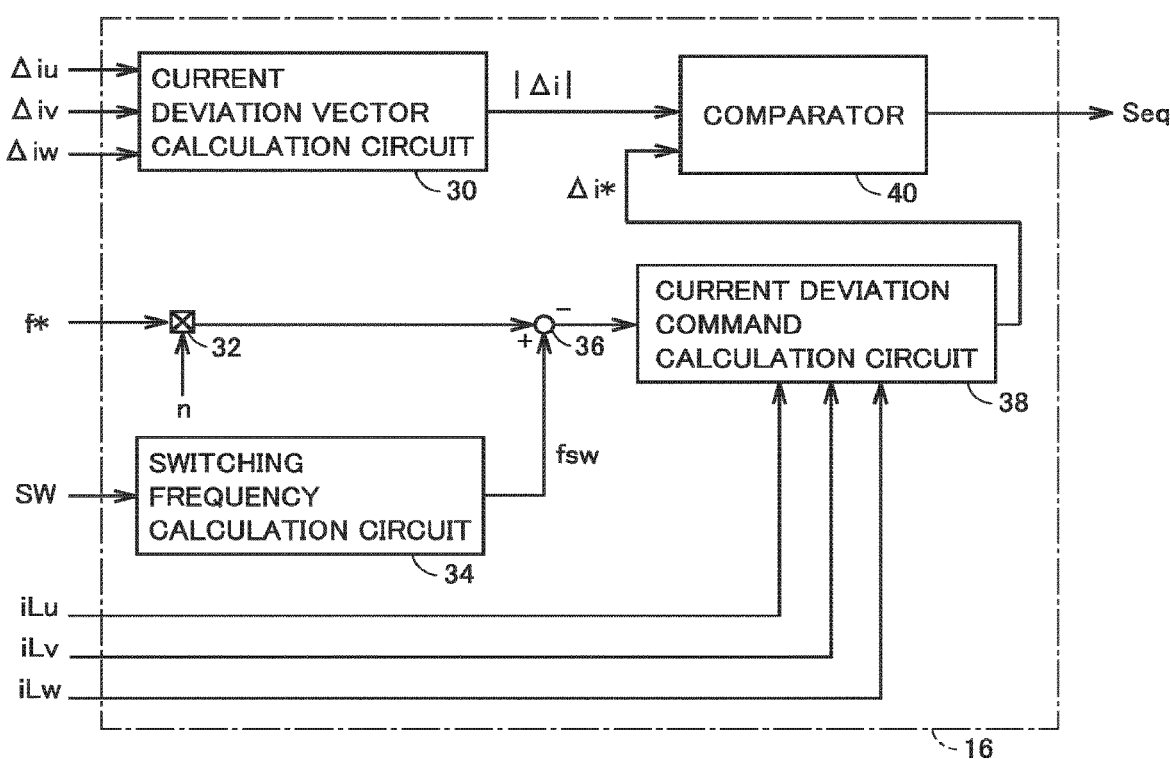
FIG. 9 is a diagram showing an example in configuration of a sequence activation circuit shown in FIG. 6.

FIG. 9 is a diagram showing an example in configuration of sequence activation circuit 16 shown in FIG. 6. Referring to FIG. 9, sequence activation circuit 16 includes a current deviation vector calculation circuit 30, a multiplier 32, a switching frequency calculation circuit 34, a subtractor 36, a current deviation command calculation circuit 38, and a comparator 40.

Upon receiving current deviations Δiu, Δiv, Δiw from subtractors 9u, 9v, 9w, current deviation vector calculation circuit 30 calculates an absolute value |Δi| of the current deviation. Absolute value |Δi| of the current deviation is input to comparator 40.

Multiplier 32 multiplies an output frequency command value f* inverter 2 by n, where n is an integer equal to or greater than 1.

Switching frequency calculation circuit 34 receives switching command vector SW output from switching sequence logic circuit 15. Switching frequency calculation circuit 34 calculates a switching frequency fsw based on switching command vector SW.

Subtractor 36 calculates a deviation f*×n−fsw of switching frequency fsw with respect to frequency command value f* multiplied by n. The calculated deviation is provided to current deviation command calculation circuit 38.

Current deviation command calculation circuit 38 subjects deviation f*×n−fsw to proportional integration (PI) to calculate current deviation command value Δi*. Current deviation command value Δi* calculated is input to comparator 40.

Comparator 40 compares absolute value |Δi| of the current deviation with current deviation command value Δi*. When absolute value |Δi| of the current deviation is larger than current deviation command value Δi*, the output signal of comparator 40, or sequence activation signal Seq, has a logical value of "1." After a switching sequence is completed, sequence activation signal Seq is cleared to a logical value of "0."

According to the above configuration, feedback control is performed so that deviation f*×n−fsw becomes zero. That is, switching command vector SW operates so as to be a frequency of output frequency command value f* multiplied by n. The deviation of the input signal of comparator 40 (|Δi|−Δi*) will change at the frequency of output frequency command value f* multiplied by n.

In the second embodiment, as well as in the first embodiment, a current value smaller than an overcurrent level of a load current is set to current limiter iLlim of the load current. When a value of load current iL detected by current detector 7 increases and reaches current limiter iLim, current deviation command calculation circuit 38 reduces current deviation command value Δi* to be smaller than that when the detected value is less than current limiter iLmin.

Specifically, when load current iL is less than current limiter iLlim, current deviation command calculation circuit 38 subjects deviation f*×n−fsw to proportional integration (PI) to calculate current deviation command value Δi* and outputs current deviation command value Δi* to comparator 40. On the other hand, when load current iL is higher than current limiter iLlim, current deviation command calculation circuit 38 refers to the FIG. 4 or 5 relationship and accordingly changes current deviation command value Δi* based on load current iL. This allows the output current of inverter 2 to better follow current command value i* when load current iL reaches current limiter iLlim. This can prevent an overcurrent from occurring and allows power conversion device 100 to continue to operate.

As has been described above, the power conversion device according to the second embodiment of the present invention can provide a function and effect similar to those of the power conversion device according to the first embodiment.

It should be understood that the embodiments disclosed herein have been described for the purpose of illustration only and are not limited to the above description. The scope of the present invention is defined by the terms of the claims, and is intended to include any modifications within the meaning and scope equivalent to the terms of the claims.

REFERENCE SIGNS LIST

1 DC smoothing capacitor, 2 inverter, 3 reactor, 4 capacitor, 5, 7 current detector, 6 voltage detector, 8u, 8v, 8w multiplier, 9u, 9v, 9w subtractor, 10u, 10v, 10w hysteresis comparator, 11 logic circuit, 12 gate circuit, 13 current deviation command generation circuit, 14 vector angle calculation circuit, 15 switching sequence logic circuit, 16 sequence activation circuit, 20 control device, 30 current deviation vector calculation circuit, 34 switching frequency calculation circuit, 38 current deviation command calculation circuit, 40 comparator, 100 power conversion device, Q1-Q6 switching element, D1-D6 diode, PL DC positive bus, NL DC negative bus, SW switching command vector, Seq sequence activation signal, iLlim current limiter, iL, iLu, iLv, ILw load current, iu, iv, iw output current, iu*, iv*, iw* current command value, Δi, Δiu, Δiv, Δiw current deviation, Δi*, Δiu*, Δiv*, Δiw* current deviation command value.

The invention claimed is:

1. A power conversion device comprising:
an inverter that has a switching element and converts DC power into AC power;
a first current detector that detects an output current of the inverter;
a second current detector that detects a load current flowing from the inverter to a load; and
a control device that controls the inverter to allow the output current detected by the first current detector to follow a current command value; wherein
the control device calculates a current deviation between the current command value and the output current detected by the first current detector, and controls switching of the switching element to allow the calculated current deviation to be equal to or less than a current deviation command value,
the control device sets a current limiter for the load current, the current limiter being smaller than an overcurrent level, and
when the load current detected by the second current detector is larger than the current limiter, the control device reduces a value of the current deviation command value to be smaller than a value of the current deviation command value applied when the load current is smaller than the current limiter.

2. The power conversion device according to claim 1, wherein the control device sets the current deviation command value to a first current value when the load current is smaller than the current limiter, and the control device sets the current deviation command value to a second current value smaller than the first current value when the load current is larger than the current limiter.

3. The power conversion device according to claim 1, wherein when the load current is larger than the current limiter, the control device decreases the current deviation command value as the load current increases.

4. The power conversion device according to claim 1, wherein the control device controls switching of the switching element to allow the output current detected by the first current detector to fall within a hysteresis band based on the current deviation command value with respect to the current command value.

5. The power conversion device according to claim 1, wherein the control device includes:
- a vector angle calculation circuit that calculates a current deviation vector angle based on the current deviation;
- a switching sequence logic circuit that generates a switching signal for the switching element, based on the current deviation vector angle and a switching state that the inverter currently has, to allow the current deviation to decrease; and
- a sequence activation circuit that generates an activation signal for the switching sequence logic circuit when the current deviation is larger than the current deviation command value.

* * * * *